United States Patent
Thomas et al.

(10) Patent No.: US 6,453,160 B1
(45) Date of Patent: Sep. 17, 2002

(54) EXPLOITING A BROADCAST SYSTEM TO ENHANCE A WIRELESS GAMING EXPERIENCE USING POSITION HOLDERS TO REPLACE DATA

(75) Inventors: Howard J. Thomas, Cirencester (GB); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/629,633

(22) Filed: Jul. 31, 2000

(51) Int. Cl.$^7$ ................................................ H04M 3/00
(52) U.S. Cl. ...................... 455/419; 455/3.06; 455/414; 463/39
(58) Field of Search ................................ 455/3.01, 3.06, 455/412, 414, 419, 426; 370/312, 401, 527, 529; 463/36–42

(56) References Cited

U.S. PATENT DOCUMENTS

| | | | |
|---|---|---|---|
| 5,392,452 A | * 2/1995 | Davis | 455/414 |
| 5,651,010 A | 7/1997 | Kostreski et al. | |
| 5,682,404 A | * 10/1997 | Miller | 370/527 |
| 5,729,549 A | 3/1998 | Kostreski et al. | |
| 5,738,583 A | * 4/1998 | Comas et al. | 463/40 |
| 5,822,324 A | * 10/1998 | Kostresti et al. | 370/527 |
| 5,999,808 A | * 12/1999 | LaDue | 455/412 |
| 6,011,548 A | 1/2000 | Thacker | |
| 6,026,360 A | 2/2000 | Ono | |

\* cited by examiner

*Primary Examiner*—William Trost
*Assistant Examiner*—Simon Nguyen
(74) *Attorney, Agent, or Firm*—Hisashi David Watanabe

(57) ABSTRACT

A wireless data system (200) and a method (400) of communicating digital data to one or more handheld wireless devices (202) are provided. The method (400) comprise the steps of removing (402) at least one data segment from the digital data to form a first digital data portion (300) and replacing (406) the at least one data segment with an at least one position holder (303, 305) embedded into the first digital data portion. The method further includes forming (409) at least one second digital data portion including the at least one data segment, communicating (413) the first digital data portion (300) to a wireless network (209), and communicating (419) the at least one second digital data portion to a broadcast transmitter (215). The method broadcasts (422) the first digital data portion (300) from the wireless network (209) and broadcasts (425) the at least one second digital data portion from the broadcast transmitter (215). The method combines (427) in the handheld wireless device (202) the at least one data segment of the at least one second digital data portion into the at least one position holder of the first digital data portion (300) to reconstitute the digital data.

25 Claims, 2 Drawing Sheets

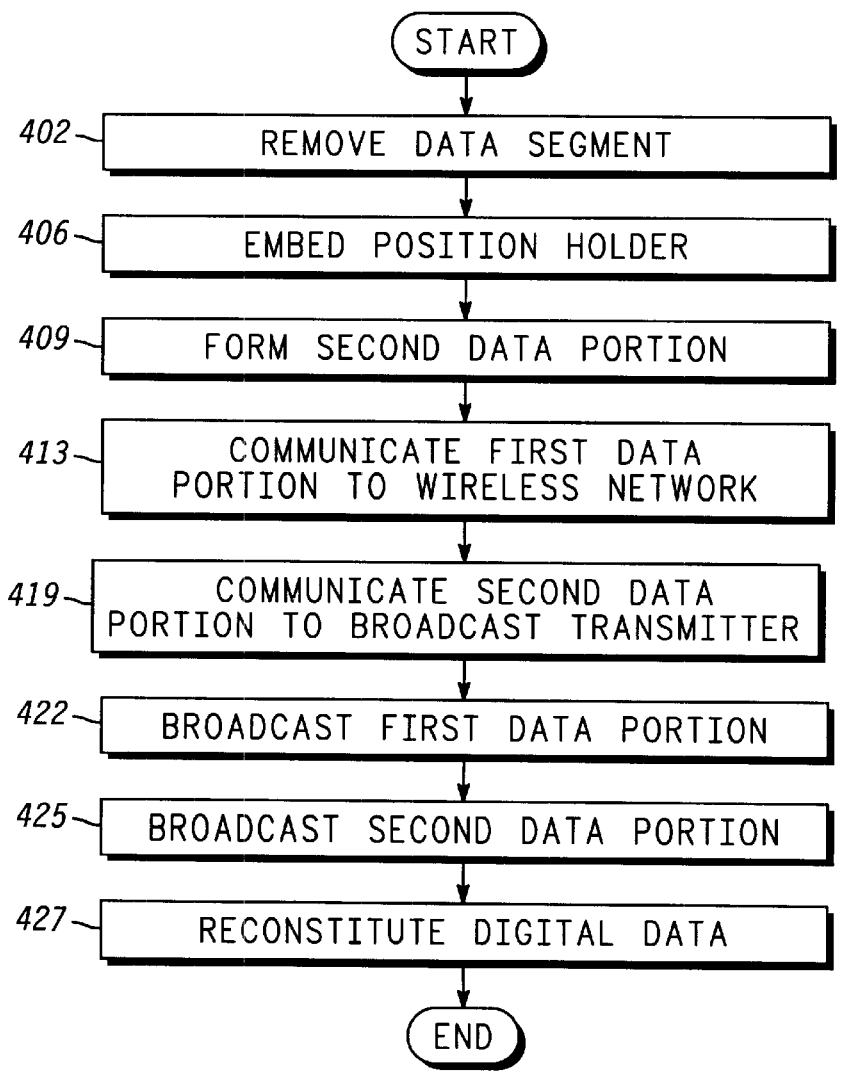

EXPLOITING A BROADCAST SYSTEM TO ENHANCE A WIRELESS GAMING EXPERIENCE USING POSITION HOLDERS TO REPLACE DATA

BACKGROUND OF THE INVENTION

1. Field of the Invention

The present invention relates generally to a wireless digital data transfer, and more particularly to a wireless digital data transfer that exploits a broadcast system to enhance a wireless gaming experience using position holders to replace data.

2. Description of the Background Art

Wireless networks are used to transmit digital data both through wires and through radio links. Examples of a wireless network are cellular telephone networks, pager networks, etc. Such wireless networks may include land lines, radio links and satellite links, and may be used for purposes such as cellular phone systems, Internet systems, computer networks, pager systems and other satellite systems. Such wireless networks are becoming increasingly popular and of increasingly higher capacity. Much information and data is transmitted via wireless networks, and they are becoming a common part of people's business and personal lives. As people use them in greater and greater numbers, these networks have been forced to grow in both size and capacity.

One aspect of wireless digital networks that has been growing rapidly is gaming. Network gaming may consist of one or more players communicating with other players or computer systems to conduct a game. These network gaming systems may encompass simulations, gambling games, interactive games, fantasy games, role playing, combat games, adventure games, etc. The popularity is growing as computer systems and computer software for such games increases in complexity and realism. Therefore, the demand for such gaming systems has increased.

The transfer of digital data includes the transfer of text, audio, and graphical data. A user may interactively acquire the data (i.e., by sending commands or requests, such as in a game), or in a more passive manner (simply accepting and using or storing the data).

In addition to gaming, this data may have a wide variety of uses, including simulations, data sharing, skills measuring or performance testing, coordinated viewing, etc.

Wireless networks have also brought about a change in devices that communicate the data. A wide variety of handheld wireless devices have been developed along with wireless networks. Such handheld wireless devices include, for example, cellular phones, pagers, radios, personal digital assistants (PDAs), notebook or laptop computers incorporating wireless modems, mobile data terminals, application specific gaming devices, video gaming devices incorporating wireless modems, etc.

To address this increasing demand for gaming, one increasingly popular alternative has been the use of wireless networks that use radio frequency (RF) transmission. For example, using wireless devices, people can participate in a gaming experience on trains, buses, taxis, in motels, restaurants, away from home, in the backyard, on the patio, etc. Therefore, there has been increasing demand for digital network gaming that can be played using both conventional land-based links and wireless networks.

FIG. 1 shows a typical prior art cellular network 100 used for gaming. This may include a cellular network 111, a gaming server 116 connected to the cellular network 111, and one or more base stations 105 connected to the cellular network 111. The base stations 105 may communicate with a plurality of devices 101. One example of such a network used for gaming is given in U.S. Pat. No. 5,738,583 to Comas et al.

A large drawback of the prior art is inadequate bandwidth. The bandwidth of a digital data link determines how much data can flow through it. The wireless network bandwidth is, of course, chosen to accommodate digitized audio signals, which do not require a large amount of bandwidth. Narrow bandwidth is a problem where graphics and video data need to be transmitted, because graphical and video data require a large amount of bandwidth (most games employ some kind of graphics and/or video). Conventional wireless networks therefore have been insufficient in performance for applications requiring transfer of large quantities of data, especially gaming data. Prior art wireless networks give a sluggish performance and unsatisfactory game play. Users want their games, or any kind of digital data download, to be as fast as they can assimilate and process the data. Users do not want to wait for data to arrive, do not want jerky images, long downloading times, and graphics that don't change as needed.

What is needed, therefore, is an improved digital data transfer method and apparatus for conducting a digital data transfer over a wireless network.

BRIEF DESCRIPTION OF THE DRAWINGS

FIG. 3 shows a first digital data portion wherein data segments in the first digital data portion have been removed and replaced by position holders; and FIG. 4 shows a flow chart of one embodiment of the method of the present invention.

DETAILED DESCRIPTION OF THE PREFERRED EMBODIMENTS

The present invention has been developed to address drawbacks in the prior art due to limited bandwidth and the resulting inferiority in digital data transfer and/or inferior game play. The present invention addresses the need for larger bandwidth capability for conducting data transfer over a wireless network, and more specifically, the need for an improved gaming experience. The present invention addresses this need by supplementing the data delivery capability of a wireless network.

Figure 1:
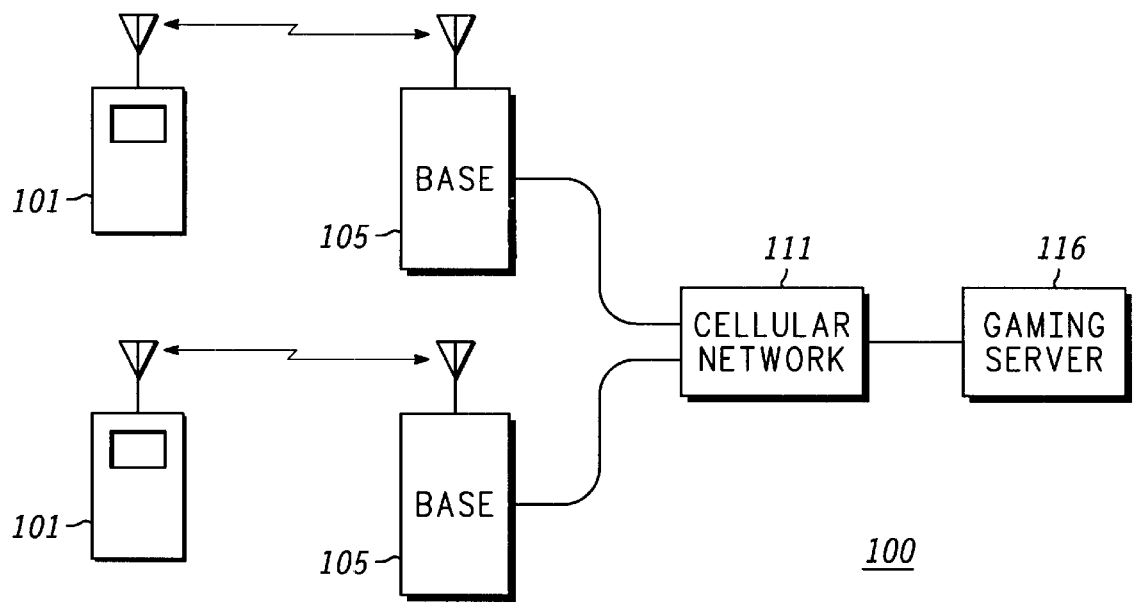
FIG. 1 shows a typical prior art cellular network used for gaming.
Figure 2:
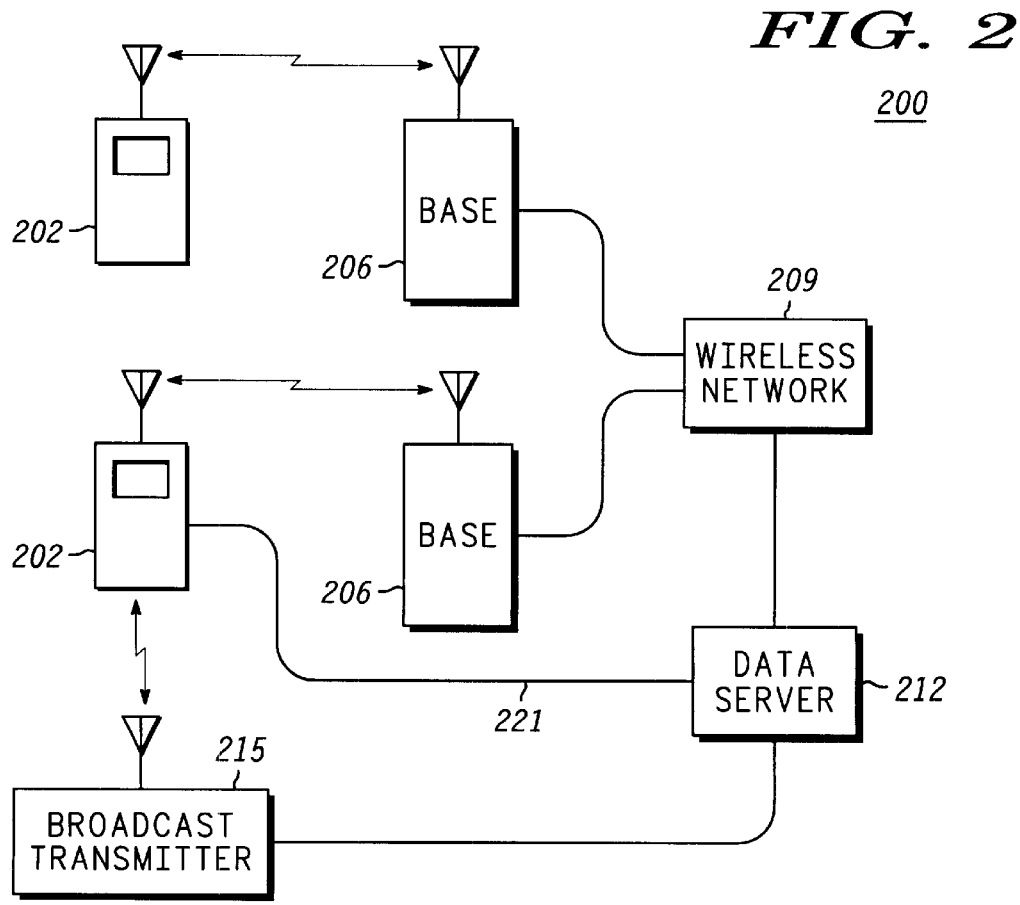
FIG. 2 shows a wireless data system of the present invention.

FIG. 2 shows a wireless data system 200 of the present invention. Included in the wireless data system 200 is a wireless network 209, a data server 212 (such as, for example, a gaming server), a plurality of base stations 206, a plurality of handheld wireless devices 202 (such as first and second wireless devices shown in FIG. 2), and a broadcast transmitter 215.

A handheld wireless device 202 may include, for example, cellular phones, pagers, radios, personal digital assistants (PDAs), notebook or laptop computers incorporating wireless modems, mobile data terminals, application specific gaming devices, video gaming devices incorporating wireless modems, etc. Preferably, with two or more wireless devices 202 in operation, the wireless devices operate in sync with each other.

The data server 212 is connected to the wireless network 209. The data server 212 may provide gaming information to the wireless network 209 (or any other type of information, but especially high-bandwidth information such as videos or graphics). The data server 212 may generate the game visuals, backgrounds, characters, audio, movements, general data, etc., to transmit to the users through the wireless network 209.

The wireless data system 200 of the present invention also includes the broadcast transmitter 215 which is connected to the data server 212. The data server 212 may therefore split up the data going to the handheld wireless devices 202 and may send only part of the information through the wireless network 209. The digital data may be divided into two or more data portions, with one or more data portions being transmitted to the plurality of handheld wireless devices 202 through the wireless network 209. The other portion or portions may be broadcast to the plurality of handheld wireless devices 202 through one or more broadcast transmitters 215.

For example, in a video game a room setting may be commonly displayed to one or more players. The room itself may not change, and only a game player's perspective within the room changes. The room data may therefore be created as a block of data elements within the gaming data that is separately broadcast by the broadcast transmitter 215.

The data may be created in different ways. In a preferred embodiment, the data, such as a video game data, may be created as partitioned data, wherein common or repetitive data elements may be segregated, marked, or identified in some manner. Alternatively, the data may be such that it is easily recognized by the data server 212 and separately transmitted (i.e., character data may be distinguishable from scenery data, etc.).

In a further refinement of the present invention, the broadcast data may be transmitted independently of a need for the broadcast data, i.e., in a non-concurrent fashion. In this manner, common or repetitive data may be broadcast in advance. The broadcast data may therefore be stored or held in a handheld wireless device 101 and used when needed. This may include, for example, an on-line game subscription wherein at sign-up a user may receive game scenery, etc., and store it for future use. The stored data may be triggered at a later time, and may be triggered multiple times.

The data server 212 may remove at least one data segment from the digital data to form the first digital data portion (see discussion accompanying FIG. 3). Similarly, other digital data portions may be formed by removing at least one data segment from the digital data. The at least one data segment of the first digital data portion is replaced by a position holder embedded in the first digital data portion. The at least one data segment is included in another digital data portion or broadcast data portion. The removal of data segments may be based on the data type, or alternatively may be based on the desired bandwidth of the first digital data portion. Also, at least a portion of the at least one data segment of one wireless device may be different from other data segments of other wireless devices.

The broadcast of the at least one second digital data portion or broadcast data portion may be done in real time (i.e., synchronously with the first digital data portion), or may be broadcast independent of the first digital data portion. For example, common or predictable data may be communicated and stored beforehand in the data server 212, and may be broadcast to the plurality of handheld wireless devices 202 before the corresponding position holders are communicated in the first digital data portion. The removed data segments may therefore be waiting at the plurality of handheld wireless devices 202 when the corresponding position holders arrive.

As previously discussed, the wireless network 209 may be, for example, a cellular network, a pager network, or a computer network of some sort. Any one of these digital networks may include the Internet or networks such as a local area network (LAN), wide area network (WAN), virtual private network (VPN), etc.

The linkages between the wireless network 209, the data server 212, and the at least one broadcast transmitter 215 may be through a dedicated wire line, through a phone line, through an RF link, etc.

The broadcast transmitter 215 may transmit any desired portion of a gaming data to the handheld wireless devices 202 via one or more independent linkages, such as, for example, an independent RF transmission link to the handheld wireless devices 202. The broadcast transmitter 215 may be land-based or satellite-based.

The broadcast transmitter 215 may use any available broadcast format or modulation, including but not limited to amplitude modulation (AM), frequency modulation (FM), phase modulation, TV broadcast format, etc. In addition, the broadcast transmitter 215 may use any available channel format or access format, such as time division multiple access (TDMA), frequency division multiple access (FDMA), code division multiple access (CDMA), Bluetooth, etc. It should be understood that the broadcast transmitter 215 may or may not conform to existing broadcast standards.

The handheld wireless devices 202 may be capable of not only receiving data from the wireless network 209 or the broadcast transmitter 215, but may also be capable of sending data. In addition, a handheld wireless device 202 may be connected to the data server through a wire link 221. The wire link 221 may be used to upload data and data objects from the handheld wireless device 202 to either the data server 212 or the broadcast transmitter 215.

FIG. 3 shows a first digital data portion 300 wherein data segments in the first digital data portion 300 have been removed and replaced by position holders 303 and 305. The removed data segments may be gaming information, scenery or a visual game background, textual information, commands, audio, etc. The resulting first digital data portion 300 may require a smaller bandwidth for communication. The removed data segments may be put into at least one second digital data portion or broadcast digital data portion and separately communicated to a handheld wireless device 202.

The position holders 303 and 305 may be used to reconstitute the digital data in the handheld wireless device 202. When both the first digital data portion and the at least one broadcast digital data portion have been received, the data segments communicated in the at least one broadcast digital data portion may be inserted back into the first digital data apportion at the appropriate locations as indicated by the position holders.

The position holders 303 and 305 may be, for example, a pointer, symbol, code, etc., that indicates where a removed data segment should be reinserted in the first digital data portion in order to reconstitute the digital data. For example, an embedded pointer type of position holder may point to a data object, where the data object is stored on the data server 212, on the broadcast transmitter 215, or on the plurality of handheld wireless devices 202.

FIG. 4 shows a flow chart 400 of one embodiment of the method of the present invention. In step 402, a number of data segments or data objects are removed from the digital data to be transmitted. The size and number of data segments to be removed may be determined by the type of data (i.e., a common background scenery) and the bandwidth of the wireless network. The removed data segments may be chosen in order to maximize a data transmission efficiency.

In step 406, the removed at least one data segment is replaced by at least one position holder embedded into the digital data, thereby forming the first digital data portion 300. It should be noted that more than one position holder may be used to replace the at least one data segment. For example, two or more symbols, codes, or pointers may be used to replace a particular data segment.

In step 409, the removed at least one data segment is incorporated in the at least one second digital data portion or broadcast digital data portion.

In step 413, the gaming server 116 communicates a first digital data portion to the wireless network 209.

As previously discussed, the first digital data portion may be any variety of information, such as information specific to a particular handheld wireless device 202, including for example gaming information, may be general information including scenery or a visual game background, textual information, commands, audio, etc. The first digital data portion may include any type or amount of data.

In step 419, the data server 212 communicates the at least one second digital data portion or broadcast digital data portion to the broadcast transmitter 215. This may or may not be done concurrently with step 413. The at least one broadcast digital data portion likewise may be any portion of the total digital data. The at least one broadcast digital data portion may be formed of at least one data segment removed from the first digital data portion. The at least one data segment should be chosen in order to maximize use of the broadcast transmitter bandwidth and minimize the impact of the wireless network bandwidth limitations on the data transfer or gaming experience.

In step 422, the wireless network 209 broadcasts the first digital data portion to the plurality of handheld wireless devices 202 through the base stations 206.

In step 425, the broadcast transmitter 215 broadcasts the at least one second digital data portion or broadcast digital data portion to the plurality of handheld wireless devices 202.

In step 427, the first digital data portion and the at least one second digital data portion or broadcast digital data portion (and any subsequent portions) are combined in the receiving device (i.e., a handheld wireless device 202) to reconstitute the digital data. The data segments or data objects contained within the at least one broadcast digital data portion are reinserted into the first digital data portion at the appropriate position holders to form the digital data.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A wireless data system, comprising:
   a plurality of handheld wireless devices capable of receiving digital data comprised of a first digital data portion and at least one second digital data portion;
   a wireless network capable of transmitting said first digital data portion to said plurality of handheld wireless devices;
   a data server for creating said digital data, said data server communicating with said wireless network and removing at least one data segment from said digital data to form said first digital data portion, replacing said at least one data segment with at least one position holder embedded into said first digital data portion, and forming said at least one second digital data portion including said at least one data segment; and
   at least one broadcast transmitter communicating with said data server and broadcasting said at least one second digital data portion to said plurality of handheld wireless devices;
   wherein said plurality of handheld wireless devices are capable of receiving and combining said at least one data segment of said at least one second digital data portion into said at least one position holder of said first digital data portion to reconstitute said digital data.

2. The wireless data system of claim 1, wherein a handheld wireless device of said plurality of handheld wireless devices comprises a handheld wireless gaming device.

3. The wireless data system of claim 1, wherein said at least one data segment comprises digital data being transmitted to two or more handheld wireless devices.

4. The wireless data system of claim 1, wherein said at least one data segment comprises a graphics data.

5. The wireless data system of claim 1, wherein said at least one data segment comprises a visual game background.

6. The wireless data system of claim 1, wherein said broadcast transmitter communicates with said data server via a wire link.

7. The wireless data system of claim 1, wherein said broadcast transmitter communicates with said data server via a RF link.

8. The wireless data system of claim 1, wherein said broadcast transmitter communicates with a wireless handheld device via a wire link.

9. The wireless data system of claim 1, wherein a wireless handheld device communicates with said data server via a wire link.

10. The wireless data system of claim 1, wherein said broadcast transmitter communicates with a wireless handheld device via a RF link.

11. A method of communicating digital data to a handheld wireless device, comprising the steps of:
   removing at least one data segment from said digital data to form a first digital data portion;
   replacing said at least one data segment with at least one position holder embedded into said first digital data portion;
   forming said at least one second digital data portion including said at least one data segment;
   communicating said first digital data portion to a wireless network;
   communicating said at least one second digital data portion to a broadcast transmitter;
   broadcasting said first digital data portion from said wireless network;
   broadcasting said at least one second digital data portion from said broadcast transmitter; and
   combining in said handheld wireless device said at least one data segment of said at least one second digital data portion into said at least one position holder of said first digital data portion to reconstitute said digital data.

12. The method of claim 11, wherein said position holder comprises a pointer.

13. The method of claim 11, wherein said position holder comprises a symbol.

14. The method of claim 11, wherein said position holder comprises a code.

15. The method of claim 11, wherein said first data portion comprises real time data.

16. The method of claim 11, wherein said at least one data segment comprises digital data being transmitted to two or more handheld wireless devices.

17. The method of claim 11, wherein said method further includes generating said first digital data portion and said at least one second digital data portion in a data server communicating with said wireless network and communicating with said broadcast transmitter.

18. The method of claim 11, wherein said handheld wireless device comprises a handheld wireless gaming device.

19. The method of claim 11, wherein said steps of communicating said at least one second digital data portion and combining said at least one data segment into said at least one position holder are done independently of communicating said first digital data portion.

20. The method of claim 11, wherein said combining is performed in real time.

21. A wireless data system, comprising:
a plurality of wireless devices including first and second wireless device, said first wireless device capable of receiving a first data portion and a broadcast data portion and said second wireless device capable of receiving a second data portion and said broadcast data portion;
a wireless network capable of transmitting said first data portion to said first wireless device and said second data portion to said second wireless device;
a data server communicating with said wireless network, said data server capable of creating said digital data, removing a first data segment from said digital data to form said first data portion, removing a second data segment from said digital data to form said second data portion, and forming said broadcast data portion including said first and second data segments; and
a broadcast transmitter communicating with said data server, said broadcast transmitter broadcasting said broadcast data portion to said plurality of wireless devices including said first wireless device and said second wireless device;
wherein said first wireless devices is capable of receiving and combining said first data segment of said first data portion into said broadcast data portion to reconstitute a portion of said digital data that is relevant to said first wireless device, and said second wireless devices is capable of receiving and combining said second data segment of said second data portion into said broadcast data portion to reconstitute a portion of said digital data that is relevant to said second wireless device.

22. The wireless data system of claim 21 wherein said first and second wireless devices, responsive to said first and second data portions respectively, operate in sync with each other.

23. The wireless data system of claim 21 wherein at least a portion of said first data segment is different from said second data segment.

24. The wireless data system of claim 21, wherein said data service is capable of replacing said first data segment with a first position holder, embedding said first position holder into said first data portion, replacing said second data segment with a second position holder, and embedding said second position holder into said second data portion.

25. The wireless data system of clam 24, wherein:
said first wireless device is capable of identifying the first data segment from said broadcast data portion and replacing said first position holder of said first data portion with said first data segment to reconstitute said portion of said digital data that is relevant to said first wireless device; and
said second wireless device is capable of identifying the second data segment from said broadcast data portion and replacing said second position holder of said second data portion with said second data segment to reconstitute said portion of said digital data that is relevant to said second wireless device.

* * * * *